(12) United States Patent
Tan

(10) Patent No.: US 8,237,387 B2
(45) Date of Patent: Aug. 7, 2012

(54) SYSTEM AND METHOD FOR CONTROLLING DUTY CYCLE OF CPU FAN

(75) Inventor: Zeu-Chia Tan, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 306 days.

(21) Appl. No.: 12/730,242

(22) Filed: Mar. 24, 2010

(65) Prior Publication Data

US 2011/0204837 A1 Aug. 25, 2011

(30) Foreign Application Priority Data

Feb. 23, 2010 (TW) ................................ 99105155 A

(51) Int. Cl.
*G05D 23/20* (2006.01)

(52) U.S. Cl. ........ 318/472; 318/430; 318/471; 700/300; 415/47

(58) Field of Classification Search .................. 318/430, 318/471, 472; 415/47; 700/300
See application file for complete search history.

(56) References Cited

U.S. PATENT DOCUMENTS

| | | | |
|---|---|---|---|
| 6,874,327 B1* | 4/2005 | Wahler et al. | 62/178 |
| 7,082,772 B2* | 8/2006 | Welch | 62/3.2 |
| 2005/0039465 A1* | 2/2005 | Welch | 62/3.7 |
| 2007/0297893 A1* | 12/2007 | Alon et al. | 415/47 |
| 2011/0054705 A1* | 3/2011 | Vaidyanathan et al. | 700/282 |
| 2011/0266356 A1* | 11/2011 | Lin et al. | 237/2 A |

* cited by examiner

*Primary Examiner* — Paul Ip
(74) *Attorney, Agent, or Firm* — Altis Law Group, Inc.

(57) ABSTRACT

A fan duty cycle controlling system and method are implemented by a computing device. The fan duty cycle controlling system obtains an optimum duty cycle range of a fan around a central processing unit (CPU), and controls the fan to operate at the optimum duty cycle range. By implementing the system and method, the computing device can obtain an optimum cooling efficiency of the computer system, and reduce system noise generated by the fan when the fan operates at the optimum duty cycle range.

12 Claims, 3 Drawing Sheets

SYSTEM AND METHOD FOR CONTROLLING DUTY CYCLE OF CPU FAN

BACKGROUND

1. Technical Field

Embodiments of the present disclosure relate generally to systems and methods for controlling temperature around a central processing unit (CPU) of a computer system, and more particularly to a system and a method for controlling a duty cycle of a CPU fan included in the computer system.

2. Description of Related Art

It is known that a CPU of a computer system generates heat while operating. The higher the CPU duty cycle is, the higher the CPU temperature is. A cooling device such as a fan is often used to lower the CPU temperature. When the CPU temperature is too high, the fan immediately starts rotating and operates at a certain duty cycle. For greater cooling effect, the duty cycle may be increased. However, the higher the fan duty cycle, the more system noise generated by the fan, and although the fan duty cycle increases, the cooling efficiency may not increase as much as expected.

Accordingly, there is a need for an improved system and a method for controlling a duty cycle of a fan around the CPU, so as to obtain an optimum cooling efficiency of the computer system, while reducing system noise generated by the fan.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
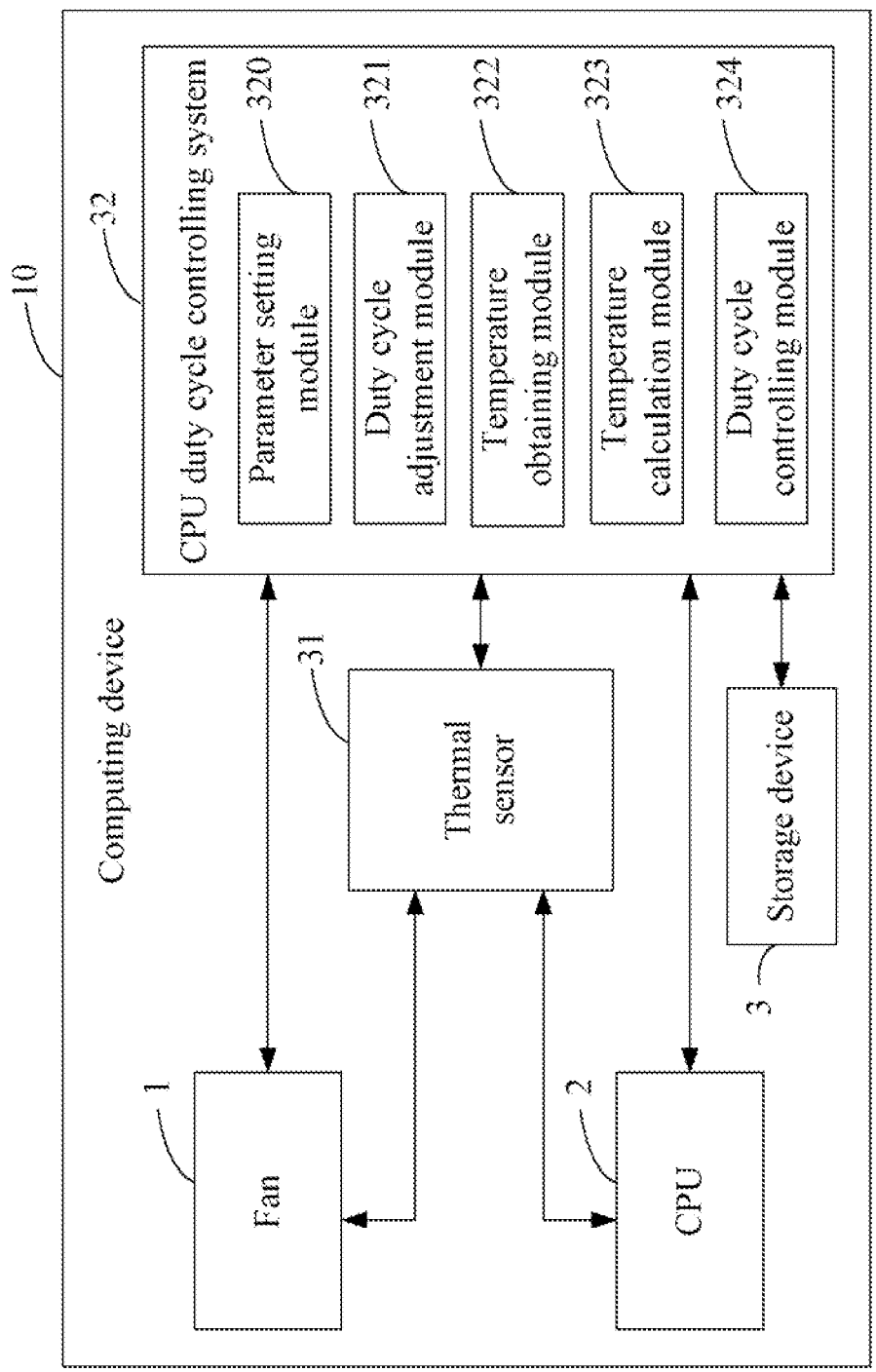
FIG. 1 is a schematic diagram of one embodiment of a computing device including a fan duty cycle controlling system.

FIG. 1 is a schematic diagram of one embodiment of a computing device 10 including a fan duty cycle controlling system 32 (hereinafter referred to as "the system 32"). In the embodiment, the system 32 is included in and implemented by the computing device 10. In one embodiment, the computing device 10 may be a personal computer (PC), a notebook, a server, a workstation, or any other electronic device. The computing device 10 may further include a fan 1 around a central processing unit (CPU) 2, a storage device 3, and a thermal sensor 31. The fan 1 is located around the CPU 2, and cools the CPU 2 to reduce CPU temperature when the CPU 2 is operating. The thermal sensor 31 connects to the fan 1 and CPU 2. The thermal sensor 31 is used to sense a system environment temperature of the computing device 10 and the CPU temperature, and send the system environment temperature and the CPU temperature information to the system 32. The storage device 3 may be an internal storage device, such as a random access memory (RAM) for temporary storage of information and/or a read only memory (ROM) for permanent storage of information. The storage device 3 may also be an external storage device, such as a hard disk, a storage card, or a data storage medium. It should be apparent that FIG. 1 shows only one example of an architecture for the computing device 10 and may include more or fewer components than shown, or a different configuration of the various components in other embodiments.

In one embodiment, the system 32 includes a parameter setting module 320, a duty cycle adjustment module 321, a temperature obtaining module 322, a temperature calculation module 323, and a duty cycle controlling module 324. One or more computerized codes of the function modules may be stored in the storage device 3 and executed by the CPU 2. In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. The modules described herein may be implemented as either software and/or hardware modules and may be stored in any type of computer-readable medium or other storage device.

The parameter setting module 320 is operable to set an initial duty cycle (denoted as "$N_0$") of the fan 1, an adjustment step (denoted as "W"), a temperature constant (denoted as "C"), and a counter (denoted as "A"). The parameter setting module 320 may further set the counter to zero, i.e., A=0. In one embodiment, the parameter setting module 320 may set the initial duty cycle $N_0$ to thirty percent of the maximum duty cycle of the fan 1, i.e., $N_0$=30%. The parameter setting module 320 may set the adjustment step W to five percent of the maximum duty cycle, i.e., W=5%, and may set the temperature constant C as two degrees, i.e., C=2° C. In other embodiments, the initial duty cycle $N_0$, the adjustment step W, and the temperature constant C may be set to different values according to user requirements. For example, the initial duty cycle $N_0$ can be set to 20% or 40% of the maximum duty cycle, the adjustment step W can be set to 2% or 10% of the maximum duty cycle, and the temperature constant C can be set to 1° C. or 5° C.

The duty cycle adjustment module 321 is operable to adjust a duty cycle of the fan 1 to a first fan duty cycle (denoted as "$N_1$") according to the initial duty cycle $N_0$ and the adjustment step W, i.e., $N_1=N_0+A \times W$. The duty cycle adjustment module 321 is further operable to adjust the duty cycle of the fan 1 to a second fan duty cycle (denoted as "$N_2$") according to the first fan duty cycle $N_1$ and the adjustment step W, i.e., $N_2=N_1+W$.

The temperature obtaining module 322 is operable to obtain a system environment temperature (denoted as "$T_A$") around the computing device 10 sensed by the thermal sensor 31. For example, if ambient temperature is 30° C., the thermal sensor 31 senses the system environment temperature $T_A$ as 30° C., and sends the system environment temperature $T_A$ to the temperature obtaining module 322. The temperature obtaining module 322 is further operable to obtain different CPU temperatures sensed by the thermal sensor 31 while the fan 1 operates at different fan duty cycles. For example, the temperature obtaining module 322 obtains a first CPU temperature (denoted as "$T_{N1}$") through the thermal sensor 31 when the fan 1 operates at the first fan duty cycle $N_1$, and obtains a second CPU temperature (denoted as "$T_{N2}$") through the thermal sensor 31 when the fan 1 operates at the second fan duty cycle $N_2$.

The temperature calculation module 323 is operable to calculate a first temperature change (denoted as "$dT_1$") of the CPU 2 according to the system environment temperature $T_A$ and the first CPU temperature $T_{N1}$, i.e., $dT_1=T_{N1}-T_A$. The temperature calculation module 323 is operable to calculate a second temperature change (denoted as "$dT_2$") of the CPU 2 according to the system environment temperature $T_A$ and the second CPU temperature $T_{N2}$, i.e., $dT_1=T_{N2}-T_A$. In addition, the temperature calculation module 323 calculates a temperature difference (denoted as "$\Delta T$") between the first temperature change $dT_1$ and the second temperature change $dT_2$, i.e., $\Delta T=dT_1-dT_2$.

The duty cycle controlling module 324 is operable to determine whether an absolute value of the temperature difference |$\Delta T$| is less than the temperature constant C set by the parameter setting module 320, for example, $\Delta T<2°$ C. If an absolute value of the temperature difference |$\Delta T$| is not less than the temperature constant C, the duty cycle controlling module 324 adds one to the counter, i.e., A=A+1. If the absolute value of the temperature difference |$\Delta T$| is less than the temperature constant C, the duty cycle controlling module 324 obtains an optimum duty cycle range (denoted as "N") of the fan 1 according to the first fan duty cycle $N_1$ and the second fan duty cycle $N_2$, and controls the fan 1 to operate at the optimum duty cycle range N. In the embodiment, the optimum duty cycle range N is between the first fan duty cycle $N_1$ and the second fan duty cycle $N_2$, i.e., N=[$N_1$, $N_2$]. When the fan 1 operates at the optimum duty cycle range N, the computing device 10 can obtain an optimum cooling efficiency of the computer system, and reduce system noise generated by the fan 1.

Figure 2:
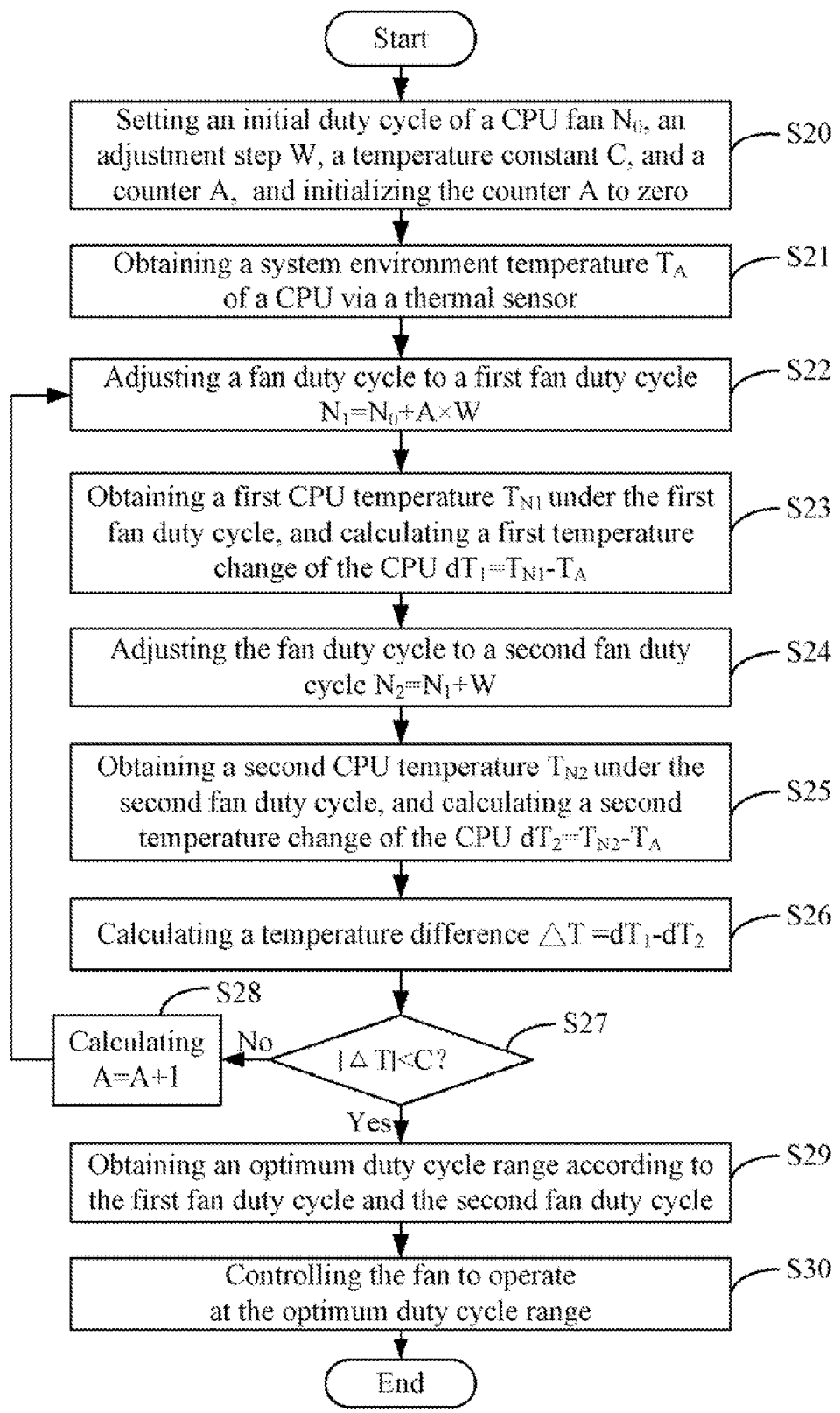
FIG. 2 is a flowchart of one embodiment of a method for controlling a duty cycle of a fan for a CPU included in the computing device of FIG. 1.

FIG. 2 is a flowchart of one embodiment of a method for controlling a duty cycle of a fan included in the computing device 10 as described in FIG. 1. Depending on the embodiment, additional blocks may be added, others removed, and the ordering of the blocks may be changed.

In block S20, the parameter setting module 320 sets an initial duty cycle (denoted as "$N_0$") of the fan 1, an adjustment step (denoted as "W"), a temperature constant (denoted as "C"), and a counter (denoted as "A"), and sets the counter A as zero, i.e., A=0. In one embodiment, the parameter setting module 320 may set the initial duty cycle $N_0$ to thirty percent of the maximum duty cycle of the fan 1, i.e., $N_0$=30%. The parameter setting module 320 may set the adjustment step W to five percent of the maximum duty cycle, i.e., W=5%, and may set the temperature constant C to two degrees, i.e., C=2° C.

In block S21, the temperature obtaining module 322 obtains a system environment temperature (denoted as "$T_A$") of the computing device 10 sensed by the thermal sensor 31. The thermal sensor 31 senses the temperature $T_A$ as 30° C. for example, and sends the system environment temperature $T_A$ to the temperature obtaining module 322.

In block S22, the duty cycle adjustment module 321 adjusts a duty cycle of the fan 1 to a first fan duty cycle (denoted as "$N_1$") according to the initial duty cycle $N_0$ and the adjustment step W, i.e., $N_1=N_0+A\times W$.

In block S23, the temperature obtaining module 322 obtains a first CPU temperature (denoted as "$T_{N1}$") through the thermal sensor 31 when the fan 1 operates at the first fan duty cycle $N_1$, and the temperature calculation module 323 calculates a first temperature change (denoted as "$dT_1$") of the CPU 2 according to the system environment temperature $T_A$ and the first CPU temperature $T_{N1}$, i.e., $dT_1=T_{N1}-T_A$.

In block S24, the duty cycle adjustment module 321 adjusts the duty cycle of the fan 1 to a second fan duty cycle (denoted as "$N_2$") according to the first fan duty cycle $N_1$ and the adjustment step W, i.e., $N_2=N_1+W$.

In block S25, the temperature obtaining module 322 obtains a second CPU temperature (denoted as "$T_{N2}$") through the thermal sensor 31 when the fan 1 operates at the second fan duty cycle $N_2$, and the temperature calculation module 323 calculates a second temperature change (denoted as "$dT_2$") of the CPU 2 according to the system environment temperature $T_A$ and the second CPU temperature $T_{N2}$, i.e., $dT_1=T_{N2}-T_A$.

In block S26, the temperature calculation module 323 calculates a temperature difference (denoted as "$\Delta T$") between the first temperature change $dT_1$ and the second temperature change $dT_2$, i.e., $\Delta T=dT_1-dT_2$.

In block S27, the duty cycle controlling module 324 determines whether an absolute value of the temperature difference |$\Delta T$| is less than the temperature constant C set by the parameter setting module 320, for example, $\Delta T<2°$ C. If the absolute value of the temperature difference |$\Delta T$| is not less than the temperature constant C, in block S28, the duty cycle controlling module 324 adds one to the counter A, i.e., A=A+1. If the absolute value of the temperature difference |$\Delta T$| is less than the temperature constant C, in block S29, the duty cycle controlling module 324 obtains an optimum duty cycle range (denoted as "N") of the fan 1 according to the first fan duty cycle $N_1$ and the second fan duty cycle $N_2$.

In block S30, the duty cycle controlling module 324 controls the fan 1 to operate at the optimum duty cycle range N. In the embodiment, the optimum duty cycle range N is between the first fan duty cycle $N_1$ and the second fan duty cycle $N_2$, i.e., N=[$N_1$, $N_2$]. When the fan 1 operates at the optimum duty cycle range N, the computing device 10 can obtain an optimum cooling efficiency and reduce system noise generated by the fan 1.

Figure 3:
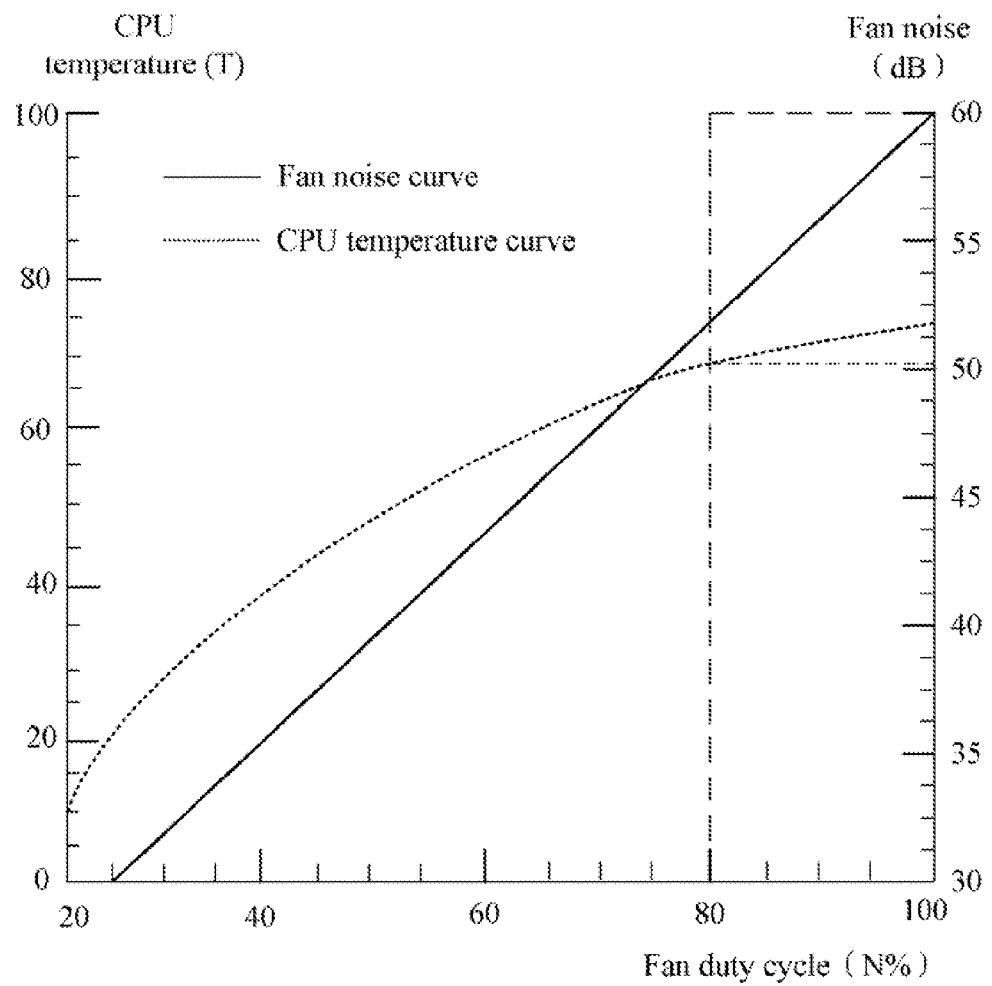
FIG. 3 is a schematic graph diagram of a relationship between CPU temperature and fan noise at different fan duty cycles.

FIG. 3 is a schematic diagram of a relationship between CPU temperature and fan noise at different fan duty cycles. The fan noise is generated by the fan 1, and increases in direct proportion to increases in the duty cycle of the fan 1. The CPU temperature does not change in direct proportion of the duty cycle of the fan 1, especially when the duty cycle of the fan 1 is over 80% of the maximum duty cycle of the fan 1. In the embodiment with respect to FIG. 3, when the duty cycle of the fan 1 equals 80% of the maximum duty cycle, the fan noise is about 52 dB and the CPU temperature is about 65° C. When the duty cycle of the fan 1 is at the maximum, the fan noise is about 60 dB and the CPU temperature has still increased to about 66.5° C. Referring to FIG. 3, the cooling efficiency of the computing device 10 has improved less, i.e., the CPU temperature changes 66.5° C.–65° C.=1.5° C., but the fan noise increases 60 dB–52 dB=8 dB, when the duty cycle of the fan 1 is over 80% of the maximum duty cycle of the fan 1. According to the present disclosure, the computing device 10 can obtain an optimum cooling efficiency of the computer system, and reduce system noise generated by the fan 1 when the fan 1 operates at an optimum duty cycle range N, such as N=[80%, 85%].

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A system for controlling a duty cycle of a central processing unit (CPU) fan included in a computer device, the computer device comprising a CPU and a thermal sensor, the system comprising:

a parameter setting module operable to set an initial duty cycle of the fan, an adjustment step, and a temperature constant;

a duty cycle adjustment module operable to adjust a duty cycle of the fan to a first fan duty cycle according to the initial duty cycle and the adjustment step, and adjust the duty cycle to a second fan duty cycle according to the first fan duty cycle and the adjustment step;

a temperature obtaining module operable to obtain a system environment temperature of the computing device sensed by the thermal sensor, obtain a first CPU temperature by the thermal sensor when the fan operates at the first fan duty cycle, and obtain a second CPU temperature by the thermal sensor when the fan operates at the second fan duty cycle;

a temperature calculation module operable to calculate a first temperature change of the CPU according to the system environment temperature and the first CPU temperature, calculate a second temperature change of the CPU according to the system environment temperature and the second CPU temperature, and calculate a temperature difference between the first temperature change and the second temperature change; and a duty cycle controlling module operable to obtain an optimum duty cycle range of the fan according to the first fan duty cycle and the second fan duty cycle when an absolute value of the temperature difference is less than the temperature constant, and control the fan to operate at the optimum duty cycle range.

2. The system according to claim 1, wherein the parameter setting module is further operable to set a counter, and initialize the counter as zero.

3. The system according to claim 2, wherein the duty cycle controlling module is further operable to determine whether the absolute value of the temperature difference is less than the temperature constant, and add one to the counter if the absolute value of temperature difference is not less than the temperature constant.

4. The system according to claim 1, wherein the optimum duty cycle range is between the first fan duty cycle and the second fan duty cycle.

5. A method for controlling a duty cycle of a central processing unit (CPU) fan included in a computing device, the method comprising:
   (a) setting an initial duty cycle of the fan, an adjustment step, and a temperature constant;
   (b) obtaining a system environment temperature of the computing device sensed by a thermal sensor of the computing device;
   (c) adjusting a duty cycle of the fan to a first fan duty cycle according to the initial duty cycle and the adjustment step, and obtaining a first CPU temperature by the thermal sensor when the fan operates at the first fan duty cycle;
   (d) calculating a first temperature change of the CPU according to the system environment temperature and the first CPU temperature;
   (e) adjusting the duty cycle of the fan to a second fan duty cycle according to the first fan duty cycle and the adjustment step, and obtaining a second CPU temperature by the thermal sensor when the fan operates at the second fan duty cycle;
   (f) calculating a second temperature change of the CPU according to the system environment temperature and the second CPU temperature;
   (g) calculating a temperature difference between the first temperature change and the second temperature change;
   (h) determining whether an absolute value of the temperature difference is less than the temperature constant; and
   (i) obtaining an optimum duty cycle range of the fan according to the first fan duty cycle and the second fan duty cycle if the absolute value of the temperature difference is less than the temperature constant, and controlling the fan to operate at the optimum duty cycle range.

6. The method according to claim 5, further comprising:
setting a counter, and initializing the counter as zero.

7. The method according to claim 6, further comprising:
adding one to the counter if the absolute value of the temperature difference is not less than the temperature constant; and
setting the second fan duty cycle as the initial duty cycle of the fan, and then repeating from block (c) to block (h).

8. The method according to claim 5, wherein the optimum duty cycle range is between the first fan duty cycle and the second fan duty cycle.

9. A storage medium having stored thereon instructions that, when executed by a central processing unit (CPU) of a computing device, causes the computing device to perform a method for controlling a duty cycle of a fan included in a computer device, the method comprising:
   (a) setting an initial duty cycle of the fan, an adjustment step, and a temperature constant;
   (b) obtaining a system environment temperature of the computing device sensed by a thermal sensor of the computing device;
   (c) adjusting a duty cycle of the fan to a first fan duty cycle according to the initial duty cycle and the adjustment step, and obtaining a first CPU temperature by the thermal sensor when the fan operates at the first fan duty cycle;
   (d) calculating a first temperature change of the CPU according to the system environment temperature and the first CPU temperature;
   (e) adjusting the duty cycle of the fan to a second fan duty cycle according to the first fan duty cycle and the adjustment step, and obtaining a second CPU temperature by the thermal sensor when the fan operates at the second fan duty cycle;
   (f) calculating a second temperature change of the CPU according to the system environment temperature and the second CPU temperature;
   (g) calculating a temperature difference between the first temperature change and the second temperature change;
   (h) determining whether an absolute value of the temperature difference is less than the temperature constant; and
   (i) obtaining an optimum duty cycle range of the fan according to the first fan duty cycle and the second fan duty cycle if the absolute value of the temperature difference is less than the temperature constant, and controlling the fan to operate at the optimum duty cycle range.

10. The storage medium according to claim 9, wherein the method further comprises:
setting a counter, and initializing the counter as zero.

11. The storage medium according to claim 10, wherein the method further comprises:
adding one to the counter if the absolute value of the temperature difference is not less than the temperature constant; and
setting the second fan duty cycle as the initial duty cycle of the fan, and then repeating from block (c) to block (h).

12. The storage medium according to claim 9, wherein the optimum duty cycle range is between the first fan duty cycle and the second fan duty cycle.

* * * * *